Oct. 27, 1970
L. LEFRANCOIS
3,536,305
APPARATUS FOR STIRRING AND CIRCULATING LIQUID MASSES
Filed Jan. 30, 1967
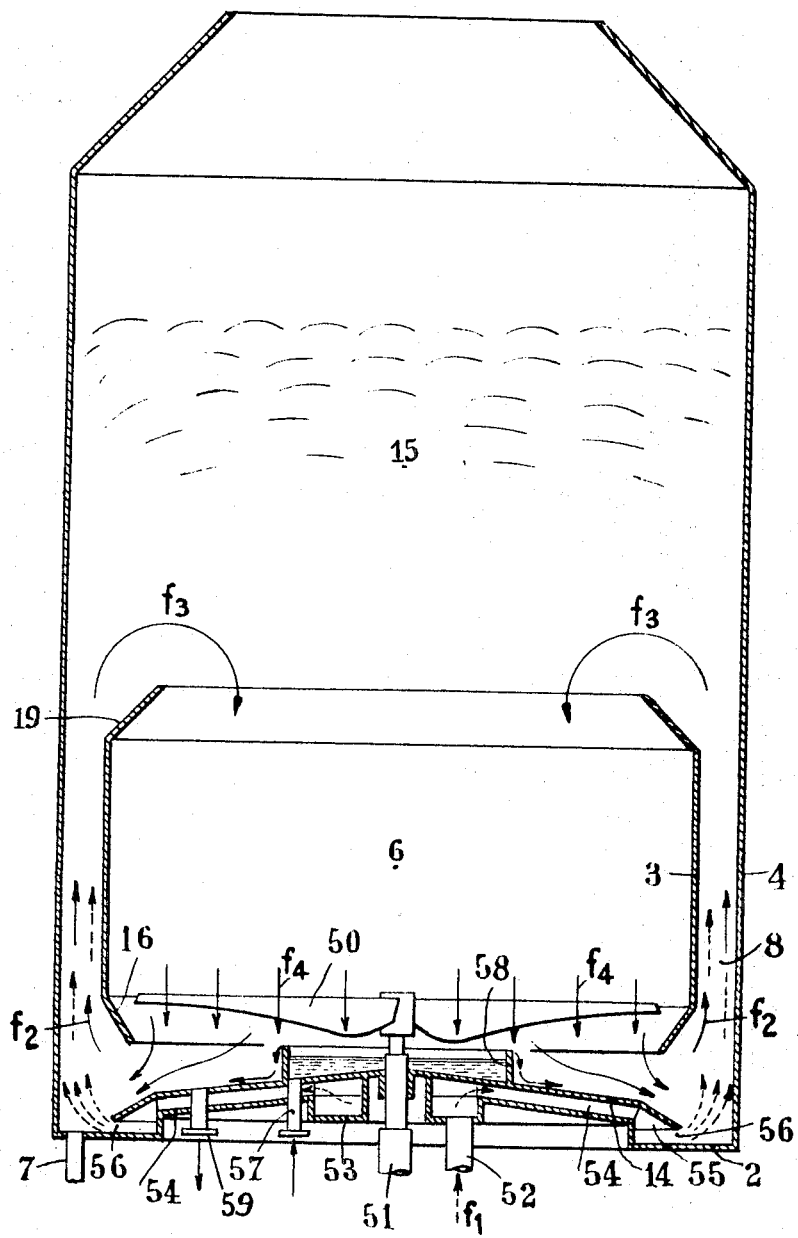

United States Patent Office 3,536,305
Patented Oct. 27, 1970

3,536,305
APPARATUS FOR STIRRING AND CIRCULATING LIQUID MASSES
Louis Lefrancois, Paris, France, assignor to Fermentation Societe Anonyme, Paris, France, a French company
Filed Jan. 30, 1967, Ser. No. 612,416
Claims priority, application France, Feb. 3, 1966, 48,309, Patent 90,116
Int. Cl. B01f 3/04, 5/10, 7/22
U.S. Cl. 261—93               2 Claims

ABSTRACT OF THE DISCLOSURE

Apparatus for stirring and circulating liquid masses comprises a vat having a top, sidewall and bottom. An annular partition spaced from the sidewall and from the bottom divides the lower part of the vat into a central space inside the partition and an annular space between the partition and the sidewall. The annular space is of smaller cross section than the central space. Gas introduced into the liquid at the bottom of the annular space produces circulation of the liquid-gas mixture upwardly in the annular space and downwardly in the central space. A rotating impeller in the central space provides mechanical propulsion in a downward direction and thereby augments circulation while stirring the liquid-gas mixture. The impeller is of a diameter to cover the entire cross-sectional area of the central space. The gas is introduced into the annular space by a central header. An annular manifold surrounds the central header and radial ducts connect the central header with the annular manifold. The manifold has an outer peripheral part provided with slots through which the manifold communicates with the inside of the vat at the lower part of the annular space. The horizontal cross-sectional area of the annular space is in the proportion of one-fourth to one-twentieth the horizontal cross-sectional area of the central space.

---

It is known to simultaneously stir and methodically circulate liquid masses by blowing gas therethrough; thus, notably, the gas may be blown through the liquid mass from the base and near the periphery thereof, the gas being distributed as evenly as possibly along this periphery whereby the direction of circulation of the liquid mass thus set in motion will be upwards at the periphery and downwards at the center; the reverse circulation may also be produced while obtaining the same advantages.

The gas may more or less dissolve, react with the circulating liquid mass, and convert same into a more or less heavy foam.

More particularly, when the gas reacts with the liquid the amount of gas necessary for producing the reaction may not be sufficient to cause a circulation as intense as desired. Instead of increasing the volume of blown gas the method of this invention, for simultaneously stirring and methodically circulating liquid masses by gas blowing, is characterized in that this gas impulse is completed by a mechanical impulse accelerating the liquid mass circulation in a manner independent of the volume of blown gas. In fact, in certain circumstances the consumption of complementary mechanical power thus resorted to may be inferior to that corresponding to an increment in the blown gas output.

Thus, any suitable and known mechanical means may be used for accelerating the central portion of the liquid mass which circulates downwards, this acceleration adding itself to that communicated by the gas blown into the ascending peripheral portion of the liquid mass.

In all cases, the cross-sectional area of the space into which the gas is blown, at the periphery of the liquid mass, must be very definitely smaller than the cross-sectional area of the central space through which the liquid is returned, for example in the proportion of one-fourth to one-twentieth of this last-named area.

This method is advantageous notably in that it permits of blowing only a limited quantity of gas (for example that necessary for producing the reaction) with the maximum recovery of the power output necessary for its compression while obtaining, due to the complementary acceleration, the best possible rate of circulation of the liquid mass.

This is actually the case when, by blowing less than one cubic meter of gas per minute and per cubic meter of calculated wort, it is desired to further increase the circulation rate.

The mechanical accelerator used for carrying out the method set forth hereinabove may consist of a rotary accelerator mounted in the central zone of the container, vat or like container, and adapted to increase the downward speed of the liquid mass, notably in the form of a screw impeller having a vertical shaft extending through the vat bottom, the screw impeller being disposed preferably in the lower portion of the central space of the vat which is bounded by an internal wall disposed coaxially to the peripheral wall of the vat, the length of the screw blades being such that they cover the entire cross-sectional area of said central space.

The screw is adapted to propel the gas-filled liquid mass through the central portion of the vat, whereby it will flow into the peripheral annular space of the vat at the same speed at all points of the vat periphery.

Of course, any other suitable mechanical means may be substituted for the above-mentioned screw impeller, and the contours of the fixed portions of the vat are shaped to minimize pressure losses in the moving liquid mass notably where changes of direction take place.

Whatever the contours contemplated, the accelerations produced by the gas blowing action and by the mechanical suction respectively add themselves to carry along the liquid mass in a same direction of circulation.

The vat bottom must be reinforced to constitute an adequate support for the mechanical means acting upon the liquid mass, this reinforcement being advantageously obtained by utilizing to this end the mounting provided for the gas blowing means.

To this end, a header disposed under the central portion of the vat may be used, together with radial ducts secured to the bottom face of the vat and connecting this central header to an annular manifold connected to the outer periphery of the vat bottom and communicating with the vat through slots disposed at the base of the annular space of the vat. These slots are not necessarily small. The gas escaping through these slots towards the lateral wall of the vat rises vertically in said annular space.

The vat bottom may also be reinforced by means of the pipe system supplying liquid thereto; thus, this system may consist of an internal basin disposed centrally of the vat bottom and receiving therethrough the screw shaft, one or more feed pipes extending through the bottom of said basin.

A specific embodiment of the improvements constituting the subject matter of this invention will now be described by way of example with reference to the accompanying drawing, in which:

The figure is a diagrammatic sectional view of apparatus in accordance with the invention. The apparatus shown by way of example in the drawing comprises a vat 4 having a bottom 2 and an annular internal wall 3.

The bottom 2 of the vat 4 comprises at least one drainpipe 7. The internal wall 3 provides an annular space 8 and a central space 6. Liquid is introduced at 57 into a basin 58 from which it flows the lower portion of the annular space 8 around the vat periphery and into the liquid 15 to be treated, above the points where the gas is blown in the direction of the arrows $f_1$ into the lower portion of the vat. The liquid mass is carried along in the direction of the arrows $f_2$, $f_3$ and $f_4$; in the vat illustrated in the figure it flows downwards through the central space 6 and upwards through the annular space 8. The vat and the internal wall 3 thereof (the latter being adequately connected in a manner not shown to the external wall of the vat) are shaped as shown to facilitate the liquid circulation.

A mechanical accelerator 50 in the form of a screw impeller is mounted in the lower portion of the central space 6 coaxially to the vat and near the bottom thereof. The function of this accelerator is to suck the descending liquid mass downwards in the central space 6 while forcing liquid into the annular space 8, thus increasing the pressure at the base (the figure) or of the annular space 8 into which gas is further blown as shown at $f_1$. The impeller 50 will thus promote the circulation of liquid in both spaces 8 and 6, whereby the output of blown gas can be reduced appreciably.

By way of specific example, the case in which air is blown into an aerobic fermentation vat of the type illustrated in the figure for growing yeasts therein will now be described.

This vat is 27 feet in diameter and its total height is 45 feet. The screw impeller 50 has a diameter of 22 feet and is driven at 15 r.p.m.; its blade leading edges are disposed 30 inches above the top of the cone 14 constituting the central portion of the bottom 2 of the vat; this screw impeller has a vertical shaft 51 extending through the top of said cone. The means provided for mounting, securing and driving the shaft 51 in the vat bottom are of conventional and known construction.

The upper edge of the internal cylinder 3 is spaced 20 feet above the vat bottom and the ends of this cylinder 3 are of frustoconical configuration as shown at 16 and 19.

The liquid mass, in the case of a moderately foaming liquid, may perform four complete circulation cycles per minute in a vat construction of this type.

With this arrangement, as the air penetrates into the lower portion of the annular space 8, downstream of the flow accelerated by the screw impeller, the following advantageous features are actually obtained: the two mechanical actions are combined and at the same time all the yeast nutrition elements, including the oxygen, meet at the points of maximum turbulence. Moreover, the uniform distribution of all these elements within the vat in the optimum zones is not only maintained but improved by the additional stirring of the masses flowing through the central space 6.

The screw position, the dimensions and contours of the fixed component elements of the structure may vary as a function of the specific problems arising in the treatment of the liquid masses contemplated, but in all cases air must be blown into the lower portion of the annular space 8 and a mechanical acceleration must be provided in the central space 6.

The air blowing means is shown as comprising an inlet 52 supplying air to a relatively large central annular header or manifold 53 mounted beneath the wall of the vat bottom and surrounding the screw shaft 51.

A series of spider-forming or radial air ducts 54 extend from this header 53 in directions parallel to the corresponding generatrices of the conical bottom 14 to which they are welded, these ducts opening into a peripheral annular outlet manifold 55. As the blown air emerges from the outlet apertures 56 of this annular manifold 55 it is directed towards the lateral walls of the vat and rises vertically in said annular space 8. The dashed arrows show the path of the air circulation and the thick-line arrows the liquid path.

The outlet apertures 56 are disposed at spaced intervals about the periphery of the manifold 55, but alternately they can be disposed only in front of the annular space segments if this space is thus divided.

Liquid is supplied to the vat through the bottom thereof by means of a duct 57 extending through this bottom and opening into an axial basin 58 of which the bottom is the bottom of the basin through which the screw shaft is mounted. On the other hand, the liquid supply may consist of a plurality of liquids and in this case a plurality of feed ducts 57 are provided. The liquid overflowing from the basin drips uniformly in the direction of the arrows towards the vat bottom and is carried along by the circulating mass towards the annular space 8.

Liquid may be discharged from the vat through a discharge pipe 59 or the drain pipe 7.

What I claim is:

1. Apparatus for stirring and methodically circulating liquid masses, comprising a vat having a bottom, top and side wall, an annular vertical partition extending from near the bottom of said vat partway to the top to divide the interior of said vat into a central space inside said partition and an annular space between said partition and the side wall of the vat, said annular space having a horizontal cross-sectional area smaller than said central space, said spaces communicating with one another above and below said partition, means for supplying said vat with liquid to a level above said partition, means at the bottom of said vat for injecting gas upwardly in said annular space uniformly around the circumference of said annular space to produce upward movement of the resulting mixture of liquid and gas in said annular space and thereby produce circulation of the liquid and gas mixture in the vat, a rotating screw impeller in said central space and means for rotating said impeller in a direction to impart to the liquid and gas mixture a mechanical propulsion in a direction to complement the circulation of said liquid and gas mixture effected by said gas, said impeller being of a diameter to cover the entire cross-sectional area of said central space, said means for injecting gas upwardly in said annular space comprising a central header disposed at the bottom of said vat beneath said central space, an annular manifold surrounding said central header, and radial ducts, connecting said central header with said annular manifold, said manifold having an outer peripheral part provided with slots through which said manifold communicates with the inside of said vat at the lower part of said annular space.

2. Apparatus according to claim 1, in which the horizontal cross-sectional area of said annular space is in the proportion of one-fourth to one-twentieth the horizontal cross-sectional area of said central space.

References Cited

UNITED STATES PATENTS

| | | | |
|---|---|---|---|
| 2,719,032 | 9/1955 | Schnur | 261—123 X |
| 3,081,289 | 3/1963 | Cheney et al. | |
| 3,405,920 | 10/1968 | Lefrancois | 261—123 |
| 1,985,153 | 12/1934 | Daman. | |
| 2,232,115 | 2/1941 | Koppers | 261—93 XR |
| 2,941,872 | 6/1960 | Pilo et al. | 261—84 X |
| 3,288,567 | 11/1966 | Graham | 261—93 X |

FOREIGN PATENTS

| | | |
|---|---|---|
| 48,730 | 4/1934 | Denmark. |
| 727,315 | 10/1942 | Germany. |

RONALD R. WEAVER, Primary Examiner

U.S. Cl. X.R.

195—109, 142; 209—169, 170; 210—197, 220; 261—124